United States Patent [19]

Armstrong et al.

[11] Patent Number: 5,045,742
[45] Date of Patent: Sep. 3, 1991

[54] ELECTRIC MOTOR WITH OPTIMUM CORE DIMENSIONS

[75] Inventors: Frederick J. Armstrong; Lynn E. Bradtmueller; Ronnie G. Smitley, all of Fort Wayne, Ind.; James P. Alexander, Schenectady, N.Y.

[73] Assignee: General Electric Company, Fort Wayne, Ind.

[21] Appl. No.: 484,597

[22] Filed: Feb. 23, 1990

[51] Int. Cl.⁵ .......................... H02K 1/14; H02K 1/26
[52] U.S. Cl. ...................................... 310/254; 310/261
[58] Field of Search ...................... 310/162, 49 R, 177, 310/216, 217, 254, 261, 269, 42

[56] References Cited

U.S. PATENT DOCUMENTS

| | | |
|---|---|---|
| 2,298,388 | 11/1942 | Knobel . |
| 2,715,690 | 8/1955 | Neuenschwander .............. 310/220 |
| 3,264,506 | 8/1966 | Carlson et al. ..................... 310/216 |
| 3,588,561 | 6/1971 | Hoffmeger et al. ................ 310/216 |
| 3,643,118 | 2/1972 | Ichiki et al. ........................ 310/40 |
| 3,749,956 | 7/1973 | Reiss .................................. 310/216 |
| 3,842,300 | 10/1974 | Daykin et al. ...................... 310/216 |
| 3,882,336 | 5/1975 | Boyd et al. ......................... 310/216 |
| 3,975,654 | 8/1976 | Dryburgh ........................... 310/172 |
| 4,053,801 | 11/1977 | Ray et al. ........................... 310/216 |
| 4,292,592 | 1/1989 | England ............................. 310/254 |
| 4,322,647 | 3/1982 | Neroda et al. ...................... 310/71 |
| 4,365,180 | 12/1982 | Licata et al. ....................... 310/216 |
| 4,374,337 | 2/1983 | Kohzai et al. ...................... 310/186 |
| 4,514,654 | 4/1985 | Muller ................................ 310/216 |
| 4,651,040 | 3/1987 | Gerstner et al. ................... 310/166 |
| 4,698,539 | 10/1987 | Workman .......................... 310/216 |
| 4,719,382 | 1/1988 | Listing ............................... 310/187 |
| 4,730,136 | 3/1988 | Muller ................................ 310/68 R |
| 4,788,465 | 11/1988 | Hertrich ............................. 310/269 |
| 4,816,711 | 3/1989 | Fritzsche ........................... 310/216 |
| 4,827,172 | 5/1989 | Kobayashi ......................... 310/216 |
| 4,859,895 | 9/1989 | Morishita et al. .................. 310/261 |
| 4,882,832 | 11/1989 | Lewis ................................. 310/42 |

FOREIGN PATENT DOCUMENTS 111603  9/1979  Japan ................................. 310/216

Primary Examiner—Steven L. Stephan
Assistant Examiner—D. L. Rebsch
Attorney, Agent, or Firm—Ralph E. Krisher, Jr.

[57] ABSTRACT

Motor for commercial and industrial applications such as golf carts and lift trucks. Features include a thin shell; stator; stator winding; and rotor. Rotor laminations have equally circumferentially spaced semi-closed slots having area for receiving conductors, and the ratio of the number of rotor lamination slots to the rotor outer diameter (measured in inches) is greater than 14.0. In one construction, this ratio is about 15.75; the ratio of the outer diameter to the rotor slot length is from about 9.04 to about 9.16; and the ratio of rotor slot depth or length to rotor slot opening width is from about 10.8 to about 12.5. Cylindrical stator lamination has a given outer diameter and a certain bore diameter determined by the distance between opposing poles. Through-bolt holes are located in the yoke, proximate the outer periphery thereof, and centered with respect to each pole. The ratio of stator pole neck minimum width to two times the yoke thickness or width is from about 0.809 to about 1.009. Methods of assembling motor components are also revealed.

19 Claims, 6 Drawing Sheets

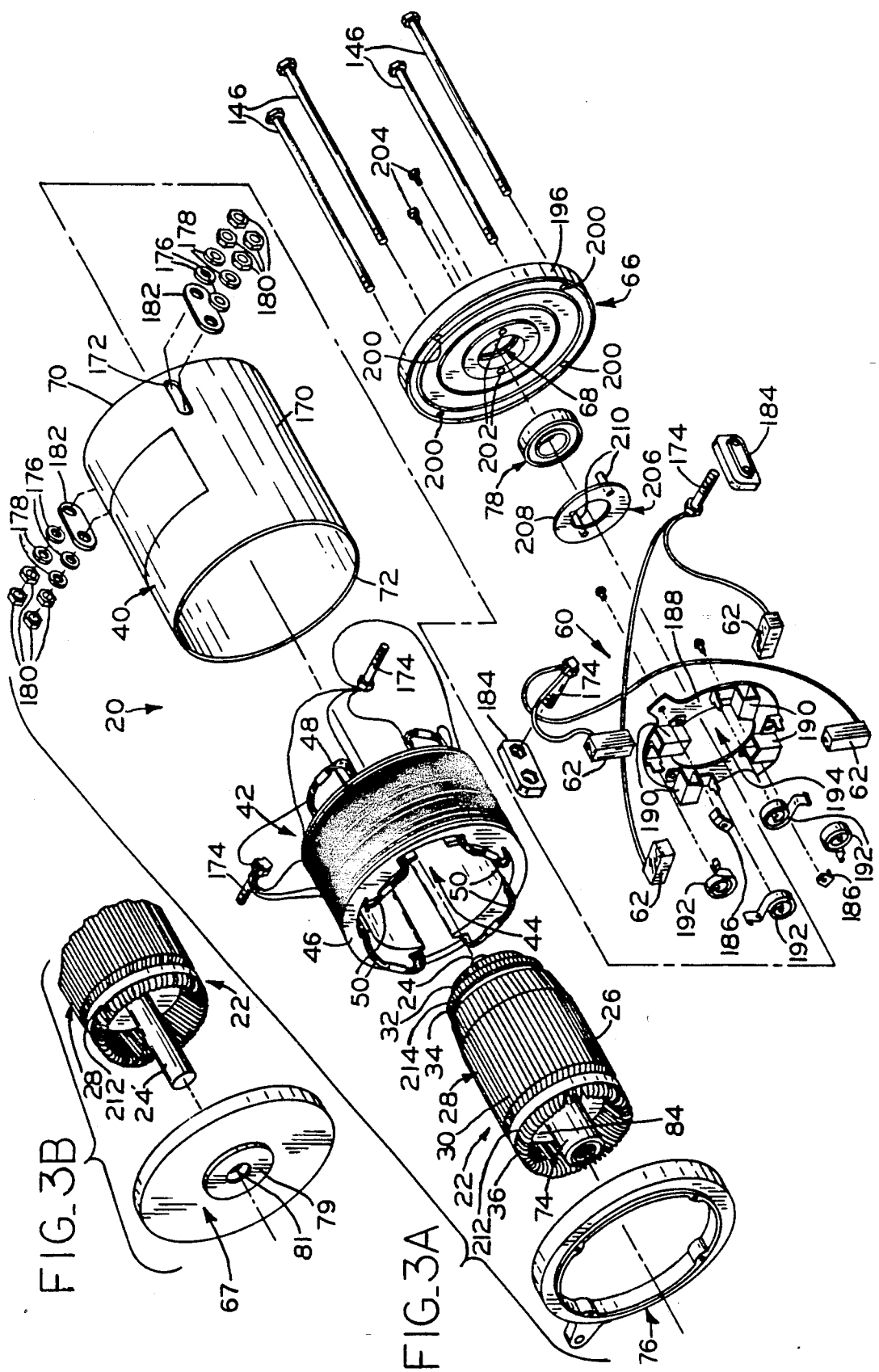

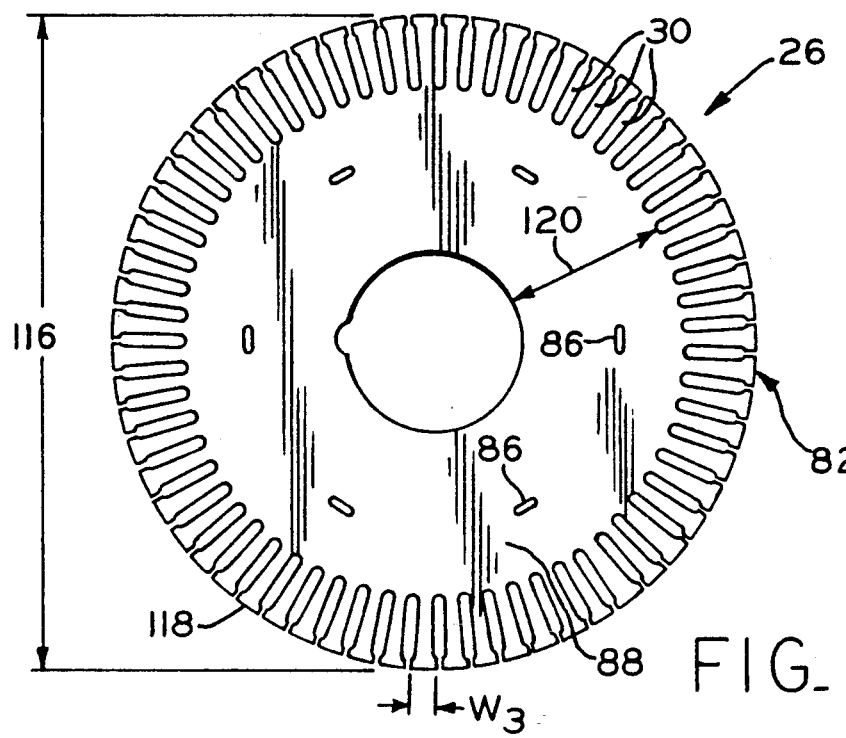
FIG_5A
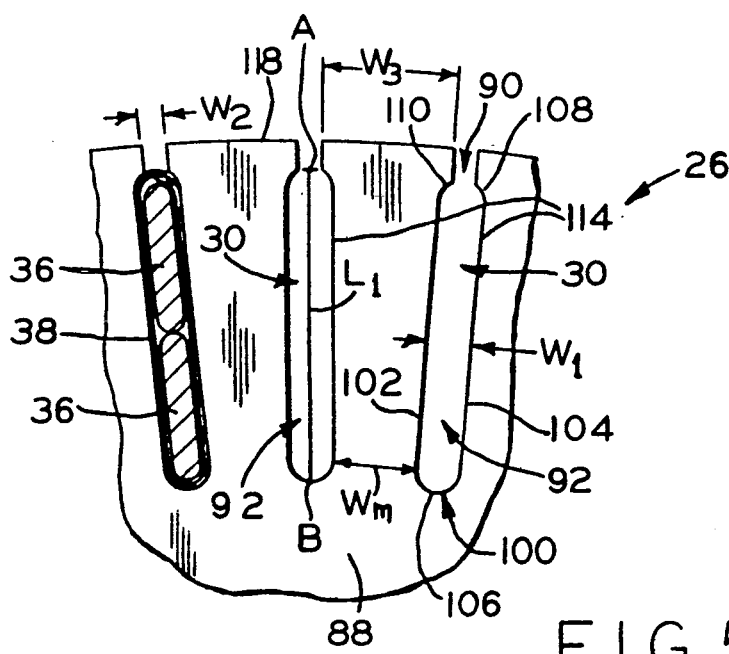
FIG_5B

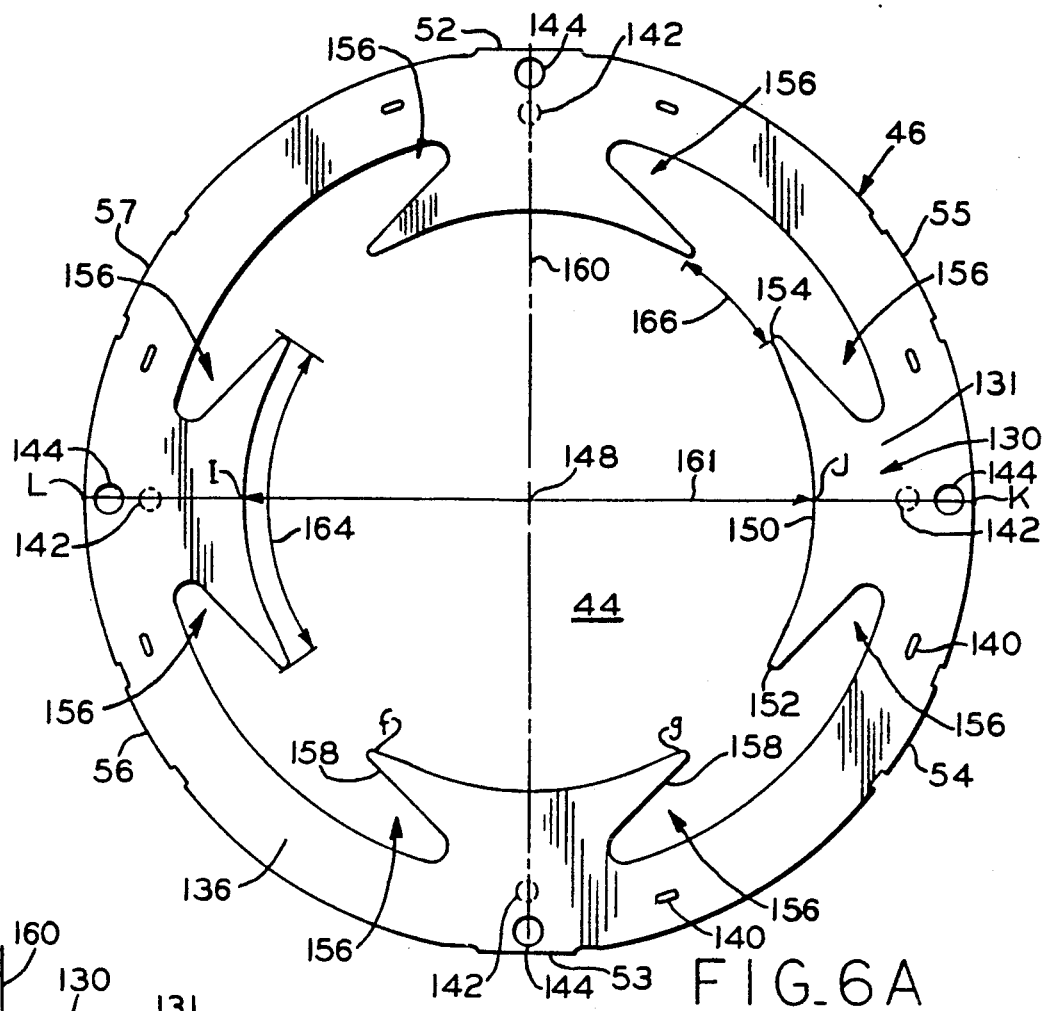
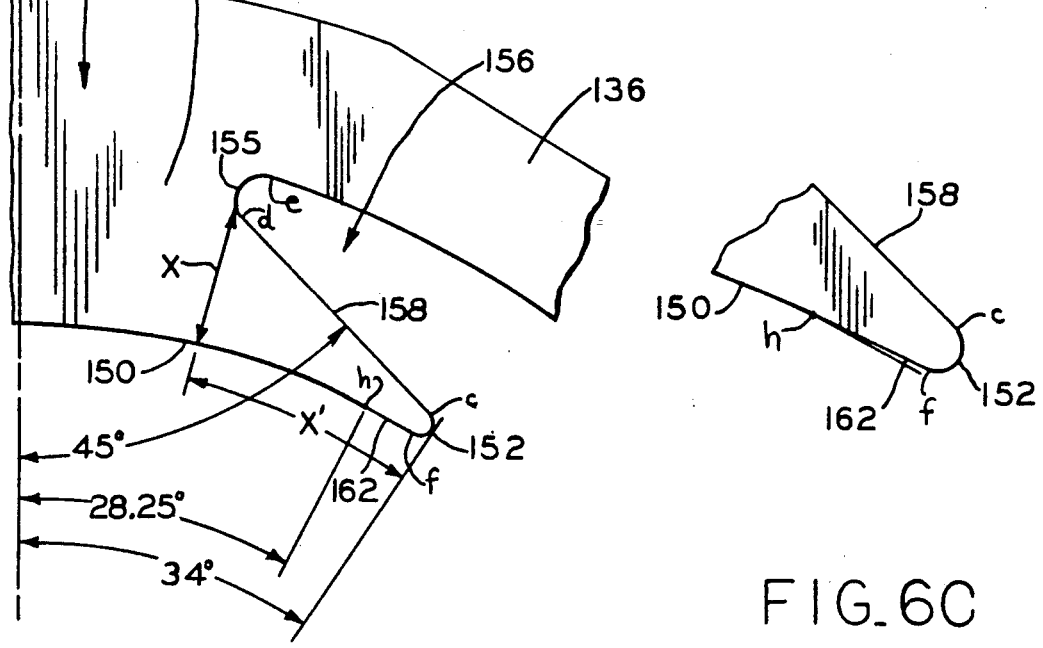
FIG_6A
FIG_6B
FIG_6C 5,045,742

ELECTRIC MOTOR WITH OPTIMUM CORE DIMENSIONS

BACKGROUND OF THE INVENTION

The present invention relates to dynamoelectric machines and methods of making the same and, more specifically to improved dc motors for commercial and industrial applications such as those utilized with golf carts, lift trucks and other industrial vehicles and methods of making such motors.

It has long been desirable to provide a direct current or universal motor having predetermined performance characteristics in a small physical size. In other words, for a motor having a specific rating, cost, and operating efficiency, it would be desirable to retain the same horsepower rating and operating efficiency while reducing the size of the various components and/or the amount of material utilized therein and thereby increase the material utilization efficiency of the motor.

Rotors formed of a stack of laminations having open slots equally spaced from one another about the periphery of each lamination for the accommodation of wire conductors are known in the prior art. However, lamination slots particularly adapted for the insertion of rectangular magnet wire heretofore have had to be sufficiently wide along the entire extent thereof (including, as is well known in the art, the slot opening or mouth) to accept the rectangular magnet wire selected for placement therein. Retaining means or wedges have usually been required to maintain the wire in position in such slots when the motor was running. It is desirable to utilize semi-closed lamination slots so that the air gap flux density will be improved as a result of smaller perturbations in the air gap flux; but the openings of semi-closed slots are typically smaller than the wire to be inserted therein, so a selected rectangular wire must either be small enough in width to pass through the slot or be inserted into the slot from the end.

Prior stator laminations and rotor laminations utilized in a specific prior art golf cart electric motor are shown in FIGS. 1-2B. The prior stator lamination 10 includes a separate yoke portion 11 and a separate pole portion 12. Each of the prior pole portions 12 comprised a plurality of stamped portions which were assembled together and then connected to the yoke 11 by various means including rivets or bolts 13. This particular stator lamination construction involved the independent manufacture of the yoke 11, the independent stamping of the pole pieces and separate manufacturing or process steps for connecting the two stator components together.

The specific geometry of the stator pole 12 restricted the flow of magnetic flux from the rotor to the stator due to the relative thin width of the stator pole tips 19. Because this restriction resulted in magnetic saturation of the lamination steel as flux flowed across the air gap from the rotor to the stator, the electrical energy required to be provided to the excitation winding around the pole had to be relatively large. The large amount of electrical energy required resulted in eight turns of rectangular copper bars (not shown) being positioned in the area between the pole tips 19 and the yoke 11.

The prior art rotor lamination 14 has sixty-three slots 15 at its periphery. In order to accept a rectangular conductor bar within the slot, the slot opening 16 had to be at least as wide as the electrical conductor but, as shown, had to be wider than the electrical conductor so that two cross-sections of the electrical conductor could fit within the slot 15 due to the decreasing width of the slot 15 from the outer periphery of the lamination toward the rotor lamination interior yoke 17. Because of the wide slot opening 16, magnetic flux transfer across the air gap into the stator poles 12 was restricted due to the smaller amount of ferromagnetic material in this prior rotor lamination tooth 18.

Because of the prior rotor lamination 14 and stator 10 geometry and their construction methods, the motor manufacturing process was expensive, and the magnetic flux transfer was inefficient.

Other arrangements are known for improving the efficiency or power output of DC and universal motors through the provision of certain slot distributions in the stator laminations, e.g., U.S. Pat. No. 3,749,956 (Reiss) issued July 31, 1973. Such stator laminations are primarily used in DC or universal motors wherein a specific relationship between the portions of the laminations is maintained in order to maintain a target efficiency. Specifically, U.S. Pat. No. 3,749,956 teaches that each lamination slot should have a depth dimension which is at least approximately three times the maximum width dimension of the slot; that each portion of the yoke should have a width adjacent each slot which is equal to at least 1.1 times the width of the adjacent portion of the slot; that the depth of each slot should be at least 1.25 times the width of the root portion of the poles; and that the distance from the center of the yoke to the deepest part of each slot should be a maximum of 1.3 times the depth of each slot. The '956 patent alleges that the physical dimensions of a stator constructed according to the teachings of the patent can be less than the physical dimensions of a conventional stator having the same efficiency and output characteristics.

Other patents which disclose various armatures and stator designs include U.S. Pat. No. 3,643,118 (Ichiki et. al.) issued Feb. 15, 1972; U.S. Pat. No. 2,715, 690 (Neuenschwander) issued Aug. 16, 1955; and U.S. Pat. No. 2,298,388 (Knobel) issued Oct. 13, 1942.

Notwithstanding the presentations of the art discussed above, there continues to be a need for improved motors and methods of making motors and their various components. Such motors desirably would provide the same and/or greater horsepower rating and operating efficiency while reducing both the size and weight of the motor; would have a rotor lamination having semi-closed slots with relatively narrow slot openings for receiving rectangular conductor members having relatively large widths therein; would have a one piece stator lamination; would have a stator lamination which provides an optimized path for magnetic flux therethrough; would have a reduced outer diameter without significant length increase; and would have increased horsepower and efficiency per unit weight and per unit volume.

SUMMARY OF THE INVENTION

In carrying out the present invention in preferred forms thereof, we provide an improved dc motor for commercial and industrial applications such as golf carts and lift trucks and methods of assembling various sub-components of the motor. One illustrated embodiment of the invention disclosed herein, is in the form of an electricmotor for powering golf carts.

Each motor preferably comprises a shell; a stator which comprises a stack of integral or unitary (i.e., one-piece) ferromagnetic laminations having a circular bore therein and that are operatively associated with the shell, a stator winding operatively positioned relative to the stator laminations; and a rotor comprising a plurality of ferromagnetic laminations forming a core, each rotor lamination having a plurality of equally circumferentially spaced semi-closed slots extending radially proximate with the outer periphery of the laminations, the slots having sufficient area for receiving conducting means therein, wherein the ratio of the number of rotor lamination slots to the rotor outer diameter measured in inches is greater than 14.

In one specific embodiment endorsement of the present invention, the ratio of the number of rotor lamination slots to the rotor lamination outer diameter measured in inches is about 15.75; The ratio of the rotor lamination outer diameter measured in inches to the rotor slot length (or depth) measured in inches is from about 9.04 to about 9.16; The ratio of the rotor slot length measured in inches to the rotor slot opening width measured in inches is from about 10.8 to about 12.5.

Another aspect of the present invention is embodied a rotor lamination for use in a dynamoelectric machine, the lamination comprising: a circular ferromagnetic plate having a plurality of equally circumferentially spaced semi-closed slots extending radially proximate the outer periphery of the plate for receiving conducting means therein, with the conducting means extending radially along the rotor when the plates are stacked with corresponding slots in communication with one another, and wherein each of the slots have an area at least sufficient for allowing the conducting means and sufficient insulation means to be contained therein, and further wherein the ratio the number of slots to lamination outer diameter measured in inches is greater than 14.0.

A still further aspect of the present invention is embodied in a stator lamination for use in a generally cylindrical stator core in a dynamoelectric machine having a shell, the stator lamination comprising: a flat annular plate of ferromagnetic material having a given outer diameter and a generally circular bore opening having a certain inner diameter, the inner diameter being determined by the distance between opposing poles which extend inwardly from the outer periphery of the lamination; a plurality of apertures operatively positioned in the plate proximate the outer periphery thereof and centered with respect to each pole for providing for the insertion of attachment means therethrough; and means, operatively positioned in the plate, for operatively connecting a plurality of the stator laminations together to form the stator core, wherein the ratio of the stator pole neck minimum, width measured in inches, to two times the yoke thickness, measured in inches, is from about 0.809 to about 1.009.

In one specific embodiment of the present invention, the ratio of the stator outer diameter measured in inches to the stator internal diameter measured in inches is greater than about 1.47. The ratio of the stator internal diameter measured in inches to the stator outer diameter measured in inches is less than about 0.68.

One other aspect of the present invention includes a method of assembling the various main components together in the manufacture of a motor.

Accordingly, an object of the present invention is to provide an improved motor having reduced size and weight.

Another object of the present invention is to provide a motor having improved efficiency per unit volume.

A further object of the present invention is to provide a motor having improved efficiency per unit weight.

A yet further object of the present invention is to provide a motor delivering approximately the same or greater horsepower but weighing less than previous motors.

A still further object of the present invention is to provide a motor having about a 3.1% smaller motor diameter than known prior existing motors.

A yet further object of the present invention is to reduce the motor diameter while keeping the motor length constant.

A further object of the present invention is to reduce the amount of copper utilized in the motor.

Another object of the present invention is to reduce motor magnetic flux losses.

A still further object of the present invention is to reduce magnetic flux bottle necking.

A yet further object of the present invention is to reduce the number of turns in the stator winding.

Another object of the present invention is to increase the overall flux level per unit excitation.

A yet further object of the present invention is to reduce the air gap between the armature and the stator core.

A further object of the present invention is to reduce the shell thickness.

Another object of the present invention is to utilize semi-closed slots in the rotor laminations.

A still further object of the present invention is to eliminate retaining mechanisms such as wedges or banding tape in the rotor.

Another object of the present invention is to reduce the MMF required to deliver the flux through the teeth of the armature.

Another object of the present invention is to improve the commutation effects.

Other objects and advantages of the invention will be apparent from the following description, the accompanying drawings and the appended claims.

BRIEF DESCRIPTION OF THE DRAWING

FIG. 3A is an exploded perspective view of a motor that embodies the present invention in one form thereof;

FIG. 3B is a partial exploded perspective view of the motor of FIG. 3A showing an alternative application end construction;

FIG. 5A is a plan view of one rotor lamination utilized in the motor of FIGS. 3A and 3B;

FIG. 5B is a partial enlarged view of the semi-closed slot of the rotor lamination of FIGS. 5A and 5C;

FIG. 6A is a plan view of the stator lamination utilized in the motor of FIGS. 3A and 3B;

FIG. 6B is partial enlarged view of the pole and winding slot area of the stator lamination of FIG. 6A;

FIG. 6C is an enlarged view of the pole tip of the stator lamination of FIG. 6A.

DESCRIPTION OF THE PREFERRED EMBODIMENT

COMBINATION SUMMARY

Figure 1:
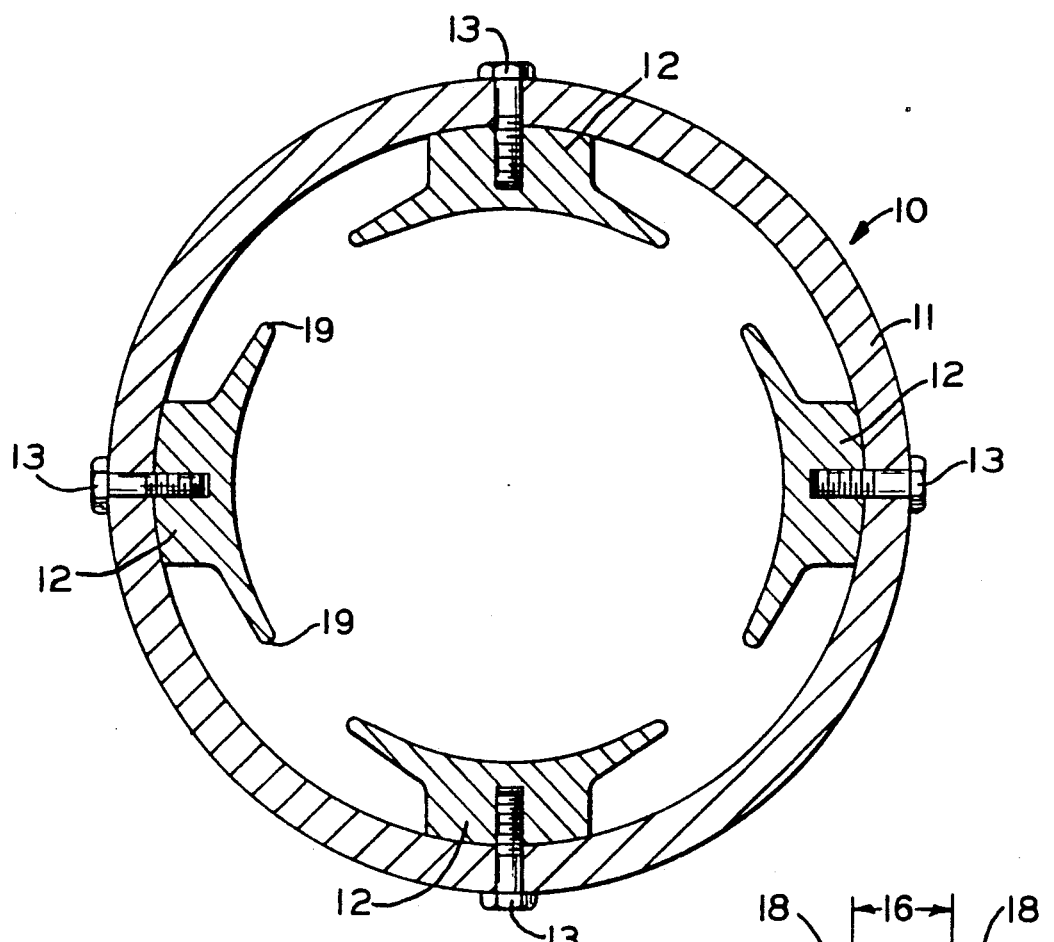
FIG. 1 is a plan view of a prior stator lamination used in a prior electric motor.

A motor embodying the present invention in one preferred form thereof is illustrated as a direct current electric motor for a golf cart application and generally designated by the reference 20 in FIG. 3A. The motor 20 comprises an armature means in the form of a rotor 22 which is shown as an assembly that comprises a shaft 24 having a connector means at one end for operatively connecting the motor to a not shown transmission or other mechanism to be driven by the motor 20, illustrated as an internal spline 74, and a plurality of rotor laminations 26 (See FIGS. 5A and 5C) that form a core 28 which is operatively connected to the shaft 24 such as by press fitting the core on the shaft. Each lamination 26 has a plurality of semi-closed slots 30 (See FIG. 5B) In addition, commutator means 32 which includes riser means 34 are operatively positioned on the shaft 24 relative to the armature core 28 at the end of the shaft opposite the spline 74, and electrical conducting means in the form of magnet wire 36 are positioned within the lamination slots 30, with each magnet wire conductor being operatively connected to the commutator 32 such as by brazing.

The motor 20 further includes a generally cylindrical thin outer shell 40 and a stator assembly illustrated as a cylindrical stator 42 (having a co-axial stator bore 44) positioned in the shell 40 such as by interference fit. The stator 42 comprises a plurality of laminations 46 that form a core 48, and a plurality of windings or coils 50 disposed on the core 48. Brush positioning means in the form of a brush plate assembly 60 is positioned in the shell 40 for operatively positioning a plurality of brushes 62 relative to the commutator 32. Rear end shield means 66, including a bearing receiving means 68, encloses one end 70 of the shell 40. As illustrated, the rear end shield 66 is connected to an adapter 76 by bolts 146 which pass through the stator 42.

While a bearing and enclosing end shield is not shown for the adapter end 72 of the motor in FIG. 3A, it is to be understood that a conventional end shield and bearings, or front endshield and a rotor shaft extension could be used in the place of the adapter 76. In such an alternative motor construction, as shown in FIG. 3B, in place of the adapter 76, an end shield 67 is provided which houses a second bearing means 79 having a hole 81 for receiving an extended shaft 24 therethrough. This alternative construction is utilized for conventional electric motor applications.

ROTOR

In one embodiment of the motor 20, the rotor 22 is supported by a suitable bearing means shown as a ball bearing 78 operatively positioned in the rear end shield 66 at one end 70 of the shell 40. Support provided by the driven mechanism for the connector means 74 also provides support of the rotor 22 for rotational movement about the longitudinal axis of the rotor. Alternatively, as shown in FIG. 3B, a second bearing means 79 provides support in conjunction with bearing means 78.

As shown in FIG. 3A, a portion of the shaft 24 within the body of the rotor 22 is connected to and extends axially from the connector means 74 to the rear end shield 66 which houses the bearing means 78. The rear end shield 66 together with the shell 40 and the mechanism or device with which the motor 20 is to be used, or alternatively the front end shield 67, serve to close the end 72 of the motor and protect the stator 42, rotor 22, and associated conductive windings 36, 50.

In the particular embodiment illustrated in FIG. 3A, an adapter means 76 is required to facilitate the operative connection between the motor 20 and known, not shown, golf cart drive mechanisms. As will be apparent to those skilled in the art, the specific construction of the adapter 76 will be different for each different specific application and the construction shown is for illustrative purposes only.

As shown in FIGS. 3A, 5A, and 5B, the rotor shaft 24 extends axially within the shell 40 when assembled therein and has a stack of rotor laminations 26 forming the core 28 operatively connected to the shaft 24 intermediate the commutator 32 and the spline 74. The rotor lamination core 28 is preferably press fitted onto the shaft 24 so that there is no slippage between the core 28, and the shaft 24. Sets of electrical conductive means shown as rectangular magnet wire bars 36 pass through the axially extending slots 30, formed in the core 28 near the outer periphery 82 of each of the laminations 26. The bars 36 are inserted in the semi-closed slots 30 after a piece of conventional insulation 38 has been inserted therein. As illustrated, the bars 36 are then operatively connected to the riser portion 34 of the conventional commutator 32.

As presently constructed, in order to assure compliance with U.L. standards, a layer of insulation material 84 (See FIG. 3A) is positioned at the end of the core 28 closest the spline 74. It is desirable that this insulation 84 be eliminated for material and process cost purposes. One way to eliminate the insulation 84, while still accomplishing the insulation function, is to provide at least a one-quarter inch overhang of the insulation 38 (FIG. 5B) beyond the end of the core 28. If sufficient insulation overhang is achieved, the layer of insulation material 84 shown would no longer be necessary.

Figure 7:
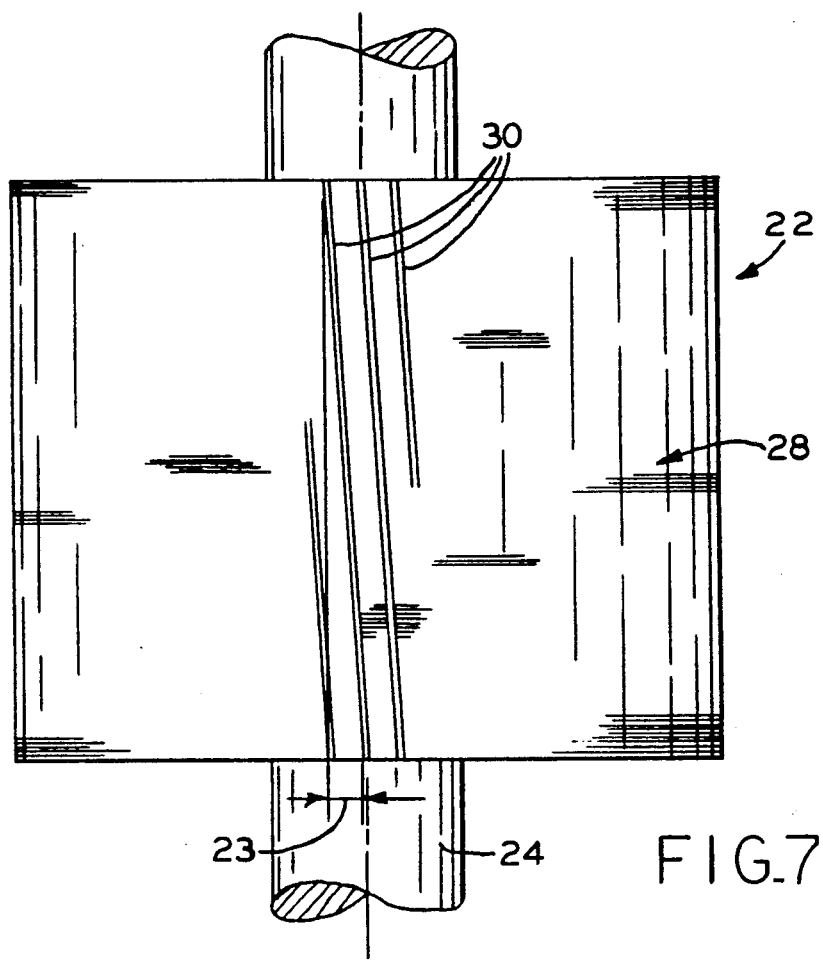
FIG. 7 is a partial plan view of a skewed slot rotor utilized with the motor of FIGS. 3A and 3B.

Shown in FIG. 7 is one means for reducing noise (in one embodiment of the illustrated rotor 22), each slot 30 has been skewed approximately one (1) slot pitch 23. Skewing is effective to reduce noise but does complicate the manufacture of the rotor core 28. Additional techinques for reducing noise which might be effective include different pole tip swaging constructions, pole face slotting with the slot corresponding to a portion of the rotor slot pitch and other techniques known in the art.

ROTOR LAMINATION

Figure 5C:
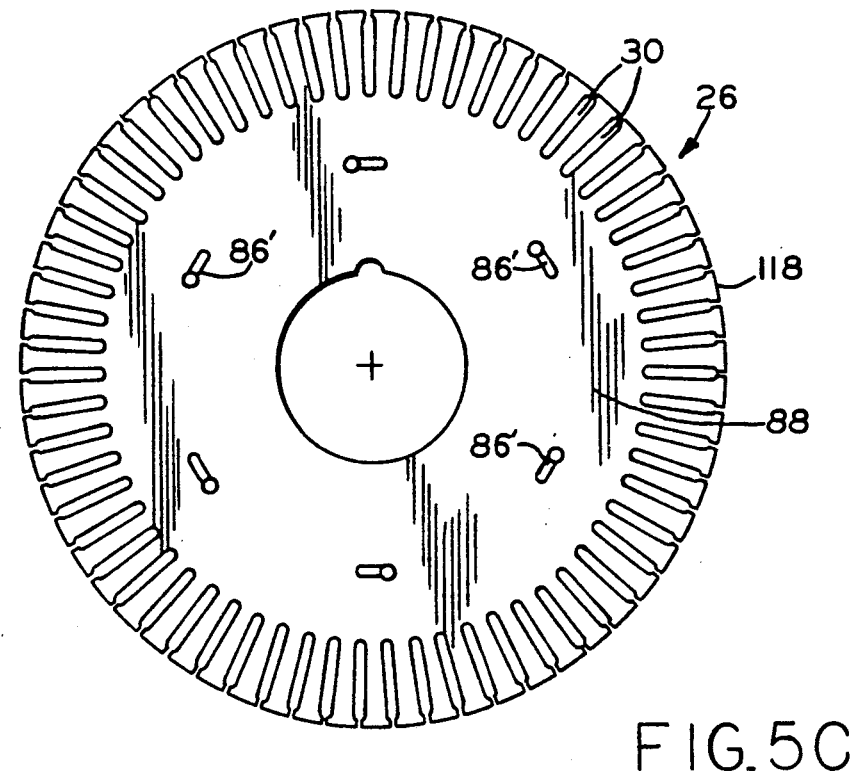
FIG. 5C is a plan view of an alternative rotor lamination utilized with a skewed rotor in the motor of FIGS. 3A and 3B.

FIGS. 5A and 5C are detailed views of alternative rotor laminations 26. The laminations 26 are punched or stamped from steel or iron, as will be understood by those skilled in the art. The lamination 26 has a number (e.g., 63 in the illustrated embodiments) of uniformly circumferentially spaced semi-closed slots 30 (see FIG.

5B) extending symmetrically about radial center lines at the outer periphery of each lamination 26 and a plurality of interlocking means 86, 86' for interlocking the laminations 26 together to form the rotor core 28.

The semi-closed slots 30 contain the bars 36 which extend substantially parallel to the axis of the rotor 22 or skewed about one (1) slot pitch (FIG. 7) when the laminations are stacked face to face with the corresponding slots 30 aligned (i.e., in communication with one another). Each of the slots 30 is substantially uniformly shaped, with the end 100 (See FIG. 5B) closest the interior yoke 88 being rounded and the opening 90 at the periphersy. Each is "semi-closed", i.e., spring width $W_2$ is more narrow than the slot width $W_1$. One advantage of using semi-closed slots is the elimination of the need for retaining members or wedges.

The lamination 26, as shown in both FIGS. 5A and 5C, has slot openings 90 which are approximately 0.038 inches wide ($W_2$) at the periphery thereof. The slot body 92 is approximately 0.440 inches in depth or length ($L_1$) from point A to point B (i.e., between the end of the opening 90 and closed end or bottom 106 of the slot). The overall width $W_1$ of the body of slot 30 is approximately 0.072 inches, and the rounded closed end 100 of slot 30 has a radius of approximately 0.036 inches. The portions 108, 110 of the slot 30 are formed with the same radius as the rounded end 100.

The area of each slot 30 between points A and B is approximately 0.2858 in$^2$ and receives two bars of magnet wire 36 that measures approximately 0.45 inches by 0.18 inches. The magnet wire occupies approximately 56% of the slot area as will be best appreciated by reviewing the left most slot in FIG. 5B where the wire 36 is shown in cross section.

The design of the rotor lamination 26 provides for optimized flux density transfer through the teeth 118, across the air gap 128, (see FIG. 4A), and into the poles 130. The width $W_2$ of the opening 90 and the width $W_1$ of the slot 30 (see FIG. 5B) are each selected to be relatively small so as to provide for enhanced magnetic flux movement through the teeth 118, across the air gap 128, and into the poles 130.

Figure 2A:
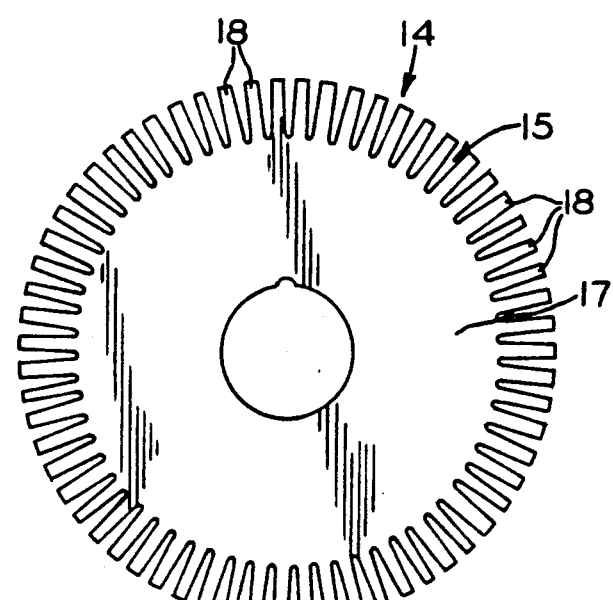
FIG. 2A is a plan view of a prior rotor lamination used in the same prior electric motor as the stator lamination of FIG. 1.
Figure 2B:
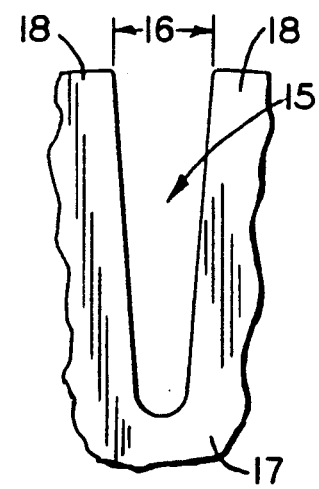
FIG. 2B is a partial enlarged view of the parallel slot of the rotor lamination of FIG. 2A.

The semi-closed slot lamination 26 is an important feature of the illustrated lamination design in that it significantly reduces the effective air gap. Specifically, if you have an open slot 15 such as that shown in FIGS. 2A and 2B, the slot opening or gap 16 seen by the stator poles 19, on average, is going to be fairly wide. This is because, as the rotor lamination rotates with respect to the stator pole, the stator is going to see a slot opening 16 for a longer period of time than if the slot opening 90 were semi-closed as in FIG. 4A. Since the slot opening throat or entrance is non-ferromagnetic, i.e., "air", a large air gap is presented to a stator pole by the slot opening. The length of time that a stator pole would see a large gap, caused by a slot opening 16 (See FIG. 2B) is greater than would occur for a semi-closed slot opening 90 (see FIG. 5B) because the tooth width $W_3$ (FIG. 5B) on the periphery of the rotor lamination 26 is relatively wider (as compared to that of lamination 14), thus making the effective air gap 128 smaller for rotors embodying the present invention as compared to the prior art constructed of FIG. 2A.

One of the major benefits resulting from semi-closed slot 30 utilization is that it allows the rotor 22 to be made smaller in diameter because the smaller effective air gap 128 causes the result that relatively more flux flows across the effective air gap. Specifically, with the semi-closed slot 30, more magnetic flux is produced per unit excitation in the field, (i.e. more flux is produced per amount of current that establishes the magnetic field). This means that one can generate the same amount of magnetic flux with less excitation in the field windings. By closing off or reducing the opening of the rotor slot, the reluctance of the magnetic circuit in the air gap has been reduced, thereby requiring less excitation to get the same amount of magnetic flux. Reduction in the amount of required excitation permits a reduction in rotor size, and a reduction in the amount of copper and iron used in the rotor while still maintaining the same amount of power output.

The worst case for flux density distribution occurs at motor starting. At starting, highest current draw and thus highest flux density conditions exist. The slot 30 width $W_1$ is designed small enough so that the teeth 118 are wide enough to become not excessivley saturated under the above-mentioned worst condition. At the same time, the slot width $W_1$ is large enough to hold conductors that can handle large currents, (so as to enable the motor to start), and also accommodate the largest rectangular conductor desired.

With reference to FIGS. 4A and 5A-C, the specific illustrated rotor 22 has an outer diameter 116 of approximately four inches, sixty-three (63) slots 30, and sixty-three (63) teeth 118 formed therein. The width $W_3$ of each tip of the tooth 118 at the outer diameter 116 is approximately 0.161 inches (0.409 cm), and the minimum width $W_M$ of each tooth 118 is approximately 0.085 inches (0.216 cm), while the yoke depth 120 is approximately 0.980 inches (2.49 cm). The ratio of the number of armature slots to the armature diameter (in inches) is thus calculated as 63 divided by four, and is approximately 15.75. In the metric system, with the same diameter of about 10.2 cm, the corresponding ratio would be about 6.3.

As can be seen from Table 1, the illustrated motor utilizes a four inch (10.16 cm) diameter rotor, and the same rotor magnet wire as the prior motor having a four and one-half inch diameter rotor. As shown in Figures compared with the prior motor rotor lamination 14 illustrated in FIGS. 1-2B, the rotor of motor 20 illustrated in FIGS. 3A-7 has smaller rotor slots 30 and smaller rotor slot openings 90.

TABLE 1

| Characteristics | New Design | | Prior Design (#1) | |
|---|---|---|---|---|
| | semi-closed arm slots parallel sided slots thru bolts behind poles "zigzag" behind poles | | open arm slots parallel sided teeth | |
| Flux Bottlenecks | laminated stator pchg neck of pole bottom of arm tooth | | laminated bolt-in poles stator yoke, pole & bend | |
| ARMATURE & STATOR STACK LENGTH (IN) (CM) | 3.25 | 8.26 | 3.00 | 7.62 |
| D$^2$L (OD Armature)$^2$ × Stack Length (IN$^3$) (CM$^3$) | 52.0 | 852.13 | 60.8 | 995.51 |

TABLE 1-continued

| | New Design | | Prior Design (#1) | |
|---|---|---|---|---|
| STATOR | | | | |
| Pole Span (degrees) | 68 | | 68 | |
| IDS (inches) (cm) | 4.03 | 10.24 | 4.54 | 11.53 |
| ODS (inches) (cm) | 6.43 | 16.33 | 6.63 | 16.85 |
| ISD/ODS | .627 | .627 | .684 | .684 |
| # of poles | 4 | | 4 | |
| length of pole arc (inches) (cm) | 2.39 | 6.07 | 2.7 | 6.86 |
| length of slot arc (inches) (cm) | .77 | 1.97 | .874 | 2.22 |
| pole neck width MIN (inches) (cm) | 1.12 | 2.84 | 1.344 | 3.41 |
| yoke thickness (inches) (cm) | .616 | 1.56 | .395 | 1.00 |
| slot area (in²) (cm²) | 1.168 | 7.54 | 1.51 | 9.74 |
| wire size (L × W) (in) (cm) | .182 | .46 | .125 | .32 |
| | ROUND WIRE | | .195 | .50 |
| # of turns | 5 | | 8 | |
| slot fill (%) | 22.27% | | 25.83% | |
| STATOR RATIOS | | | | |
| pole neck to (yoke*2) (in) (cm) | .909 | | 1.701 | |
| ARMATURE | | | | |
| OD (inches) (cm) | 4 | 10.16 | 4.5 | 11.43 |
| stack length (inches) (cm) | 3.25 | 8.26 | 3.00 | 7.62 |
| # of slots or teeth | 63 | | 63 | |
| width of tooth @ OD (inches) (cm) | .161 | .41 | .142 | .36 |
| width of tooth MIN (inches) (cm) | .085 | .22 | .142 | .36 |
| width of slot @ OD (inches) (cm) | .038 | .10 | .0825 | .21 |
| yoke width (inches) (cm) | .980 | 2.49 | 1.209 | 3.07 |
| slot area (in²) (cm) | .0289 | .18 | .037 | .24 |
| wire size (L × W) (inches) (cm) | .045 | .11 | .045 | .11 |
| | .18 | .46 | .18 | .46 |
| slot fill (%) | 56.68% | | 43.80% | |
| ARMATURE RATIOS | | | | |
| (Min Tooth Width)*(# Teeth Under Pole) to Arm Yoke Width | 1.028 | | 1.397 | |
| (Min Tooth Width)*(# Teeth Under Pole) to Stator Pole Neck Min Width | .900 | | 1.256 | |
| Arm Yoke Width to Stator Pole Neck Min Width | .875 | | .900 | |
| Arm Yoke Width to Stator Yoke Thickness | 1.591 | | 3.061 | |
| Arm Slots to Arm Diameter | 15.750 | | 14.000 | |

The average length of one turn of rotor winding was the same for both rotors, but the rotor core 28 has been increased by ¼ inch (0.635 cm) or 8.33% in length.

STATOR

Figure 4A:
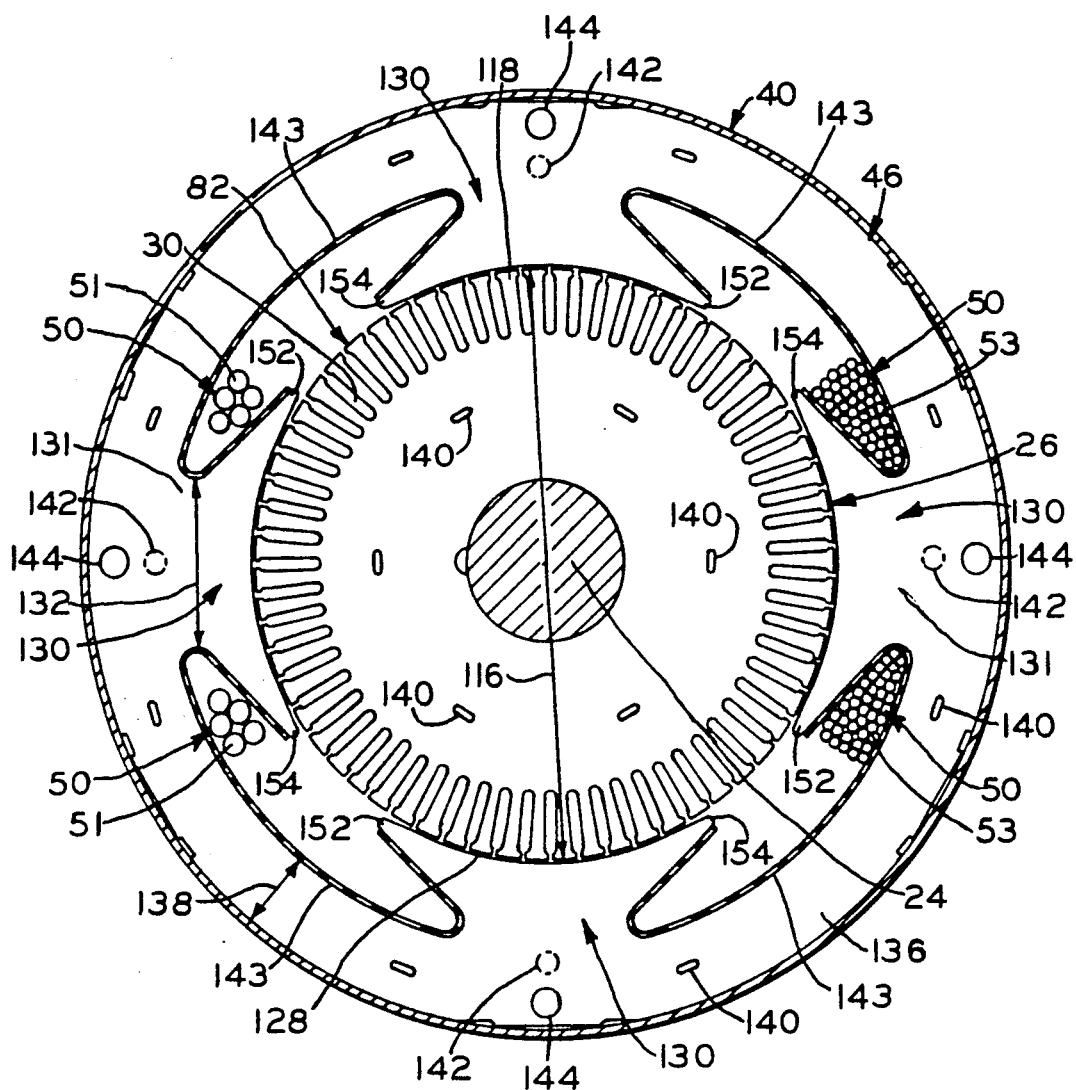
FIG. 4A is a sectional view, with parts removed, parts in section, and parts broken) away of the motor of FIG. 3.

As shown in FIGS. 3A, 4A, and 6A, the stator assembly 42 includes a stack of stator laminations 46 of ferromagnetic material, four exciter winding coils 50 that each include preferably five (5) turns of exciter winding material 51 wound about the neck of each pole of the core 48 or alternatively a plurality of smaller diameter material 53 equivalent to five (5) turns of the large size of wire. The two alternative constructions are shown on FIG. 4A with the larger diameter five (5) turn construction being on the left side of the figure. A plurality of different power outputs can be achieved by utilizing a plurality of different number of turns having a plurality of different wire sizes (i.e. cross sectional areas).

The stator laminations 46 are stacked face-to-face and are held together preferably by interlocking means 140 to form a core 48. Alternatively, additional holes 142 could be provided for rivets or the like to hold the core 48 together. Other alternative techniques for making the stator core could also be used of course, and such techniques include the use of loose laminations, core bonding, core welding, or core cleating (or keying), all as are known in the art. Conventional insulating material 143 such as a Dacron-Mylar-Dacron (DMD) paper or Nomexpaper (all of which are registered trademarks of the E.I. Dupont de Nemours Company) is utilized to line the area between adjacent pole tips 152, 154, so as to separate the winding turns 50 from the stator core iron (best shown in FIG. 4A).

STATOR LAMINATION

One important aspect of the improved motor resides with the improved manufacturability and magnetic optimization of the stator lamination design. The stator lamination 46 is specifically designed so that it can be economically stamped and individual laminations assembled into stacks forming a lamination core 48. In order to achieve the desired improved manufacturability and optimized magnetic flux transfer, the details of the specific geometry of the stator laminations and interaction with the rotor core 28 and other motor components is critical with respect to the aspects and relationships pointed out hereinbelow.

As shown in FIGS. 6A-6C, the integral one-piece stator lamination 46 comprises a yoke 136 that in turn has a plurality of holes or apertures 144 formed therein near the outer periphery of the lamination. The holes 144 are located on the centerline of each of the poles 130. The holes 144 are adapted to receive bolts 146 (See FIG. 3A) or the like which are utilized for fastening the end structures (e.g. end shields 66, 67 and/or an end shield 66 and an adapter 76) together for maintaining the structural integrity of the motor 20.

The poles 130 extend inwardly toward the bore 44 from the yoke 136 and are preferably centered with respect to each of the holes 144. Each pole 130 has a neck or neck portion 131 and a pole face 150 having two pole tips or tip portions 152, 154 (See FIG. 6A). The neck 131 connects the yoke 136 with the face 150 so that slots 156 are formed on each side of the neck portion 131.

The central location of the holes 144 relative to the center of each pole 130 reduces the core magnetic losses as compared with prior motors such as illustrated in FIG. 1 and where such bolt holes are located in the yoke between adjacent poles. It is preferred to locate the holes 144 as close as possible to the outer periphery of the lamination 46 in order to provide minimum restriction to the flow of flux between each pole and the poles adjacent thereto. However, the holes should be far enough from the periphery to provide the necessary structural strength during the lamination punching process. Specifically, the minimum distance between the hole and the lamination outer periphery should be greater than the thickness of the lamination.

It can be readily appreciated by those skilled in the art that the location of the holes 144 relative to the centerline of the poles 130 will result in the magnetic flux being less restricted at the poles than if the holes were to be located on the stator lamination 46 at a point in the yoke 186 intermediate any two of the holes 144. It is believed that the location of the holes 144, as shown, reduces the restricting effect of the holes on the magnetic flux to approximately half that which would result if similar holes were positioned in the yoke between stator poles.

The stator pole neck minimum width 132, as illustrated in FIG. 4A, is relatively small when compared to prior existing motors such as that in FIG. 1 (also see Table 1 wherein actual dimensions are given). As will be appreciated by those skilled in the art, the stator pole neck 131 serves as a constraint on the amount of magnetic flux which can flow across the air gap 128 from the rotor 22 to the stator 42. The decreased stator outer diameter of lamination 46 actually decreases the actual area available for housing the winding between 5 the poles and thus might cause one to think there would a reduction in the maximum magnetic flux production capacity of stator core 48. However, the decreased stator pole neck width in combination placement of the holes 144 actually provides a significant increase in magnetic flux flow (magnetic flux transfer efficiency) and this actually results in a reduced amount of copper required in the stator coils 50 (since the gross amount of flux produced may be reduced). In fact, for one specific motor model having predetermined performance specifications, we can reduce the amount of wire used from 8 turns to 5 turns (Tables 1 and 4) for a roughly thirty-three (33%) wire savings, while the stator core length for such motors is increased only slightly (from three to three and one-quarter inches) for the model discussed.

As shown in FIG. 6B, the relationship between the dimensions X' and X is selected so that X is equal to 0.6X'. It has been determined that this relationship allows the magnetic flux density to remain low and unsaturated while at the same time achieving good flux distribution along the pole face. If X is greater than 0.6X', the magnetic flux will not saturate the iron in the stator pole tips but flux distribution is not as smooth as desired for two reasons. One reason is that the flux would tend to go around in a circle and would be pushing more towards the center of the pole 130. The second reason is that if X is too much larger than 0.6', the winding area 156 will be unacceptably reduced.

With reference to FIGS. 6A and 6B, it should be noted that the line 158 between points c and d connecting each of the two pole tip portions 152, 154 with the neck 131 is straight and the bottom of the winding slot, i.e., the rounded portion 155 from point d to e connecting the yoke portion 136 with the neck 131 has a radius of approximately 0.112 inches (0.284 cm). Each pole tip 152, 154 has a rounded portion from point c to f having a radius of approximately 0.0425 inches (0.108 cm). The radius from point h to the corresponding point on pole tip 154 is approximately 2.015 inches (5.118 cm) as measured from the center point 148 shown in FIG. 6A. The end of each tip 152, 154 extends 34 degrees left and right of a line 160 through the center of the pole 130.

As shown in FIGS. 6B and 6C, the straight line 162 is tangent to a circle having a 0.0425 inch (0.108 cm) radius at point f and a circle having a 2.015 inch (5.118 cm) radius at point h at a distance of about 28.25 degrees from the line 160. The above is known as swaging the stator pole tips 152, 154. The utilization of swaging on the stator pole tips improves commutation and thereby enhances brush life. An additional advantage of swaging in combination with maintaining the distance X equal to the distance 0.6X' and the semi-closed slots 30 is that the impulse curve is smoothed out as the rotor rotates within the stator (FIG. 4B).

Figure 4B:
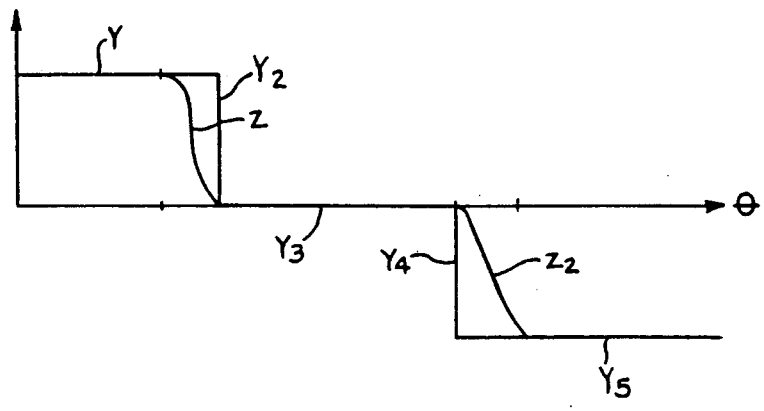
FIG. 4B is a graphic representation of the flux density induced by the stator windings as seen in the motor air gap as the rotor rotates in the stator.

As shown in FIG. 4B, as the rotor rotates inside the stator without the swaged stator pole tips, the instantaneous flux density would be as illustrated by line Y-Y2-Y3-Y4-Y5 in FIG. 4B. This kind of instantaneous change results in eddy current losses and other losses which essentially require that greater power be supplied to the excitation windings. With swaying, the resulting instanteous flux density curve in FIG. 4B would look more like that represented by line Y-Z-Y3-Z2-Y5. Thus, as a result of swaging, the eddy current losses have been somewhat reduced at the stator pole tips.

As best shown in FIG. 6C, the tip 152 is rounded along line 150 to point h and then is a straight line from point h to point f. By making this and a straight line (swaging the tip) and then rounding off the tip 152, not only is stamping die life increased but the flux transfer is made smoother. With this particular pole tip design, the flux density is optimized and there is sufficient space in the slot 156 to house sufficient copper for the winding. The net result is that magnetic flux losses are reduced, commutation is improved and brush wear is reduced.

As shown in FIG. 6A and 6B and in Table I, the stator lamination pole span is approximately 68 degrees. The IDS (internal diameter) from point I to J of line 161 is approximately 4.03 inches (10.24 cm) and the ODS (outer diameter) from point K to L of line 161 is approximately 6.43 inches (16.33 cm). The ratio of the IDS measured in inches to the ODS measured in inches is approximately 0.627 and the ratio of ODS measured in inches to the IDS measured in inches is approximately 1.5956 for the illustrated four pole stator lamination. The length of the pole arc 164 is approximately 2.39 inches (6.07 cm); the length of the slot arc 166 is approximately 0.774 inches (1.97 cm); the minimum pole neck width 132 (FIG. 4A) is approximately 1.12 inches (2.84 cm); the yoke 136 thickness is approximately 0.616 inches (1.56 cm); and the area of each slot 156 is approximately 1.168 in$^2$ (7.54 cm$^2$). When five turns of round magnet wire 51 having a diameter of 0.182 inches (0.46 cm) is wound around each pole 130, approximately 22.27% of the slot area is filled. The ratio of the pole neck 131 thickness to two times the yoke 136 thickness is approximately 0.909.

As shown in FIG. 6A, the illustrated stator lamination 46 has six (6) flat portions 52, 53, 54, 55, 56, 57. The flat portions are the results of utilizing a zigzag method of punching laminations from sheet stock material when making the lamination 46, minimizes scrap. The utilization of the zigzag method in the stamping operation results in the utilization of about 11% less stock sheet versus conventional stamping methods to provide an equal number of laminations. While there is significant material savings, a small negative effect results in the form of higher magnetic flux losses due to the slight air gaps (FIG. 4A) between the flats and the shell 40. These losses are minimal in that they do not significantly affect the magnetic flux transfer and thus the significant material savings are considered to be the more beneficial.

SHELL

The outer shell 40 consists of thin, preferably 0.071 inches (0.180 cm) thick as illustrated, sheet metal 170 stamped and then rolled so that two sides can be operatively connected by a conventional means such as welding, sonic welding or other well-known methods. Two slots 172 are either stamped, or later drilled, in the shell 40 for receiving terminals 174 which are operatively connected to the brushes 62 and the stator coils 50 as known to those skilled in the art. The terminals 174 are secured to the shell 40 by means of flat washers 176 and lock nuts 180 with an insulating means being positioned between the shell 40 and the flat washers 176. Interior insulating means 184 are positioned inside the shell 40 and also receive the terminals 174.

BRUSH PLATE ASSEMBLY

The brush plate assembly 60 is operatively connected to the shell 40 by bracket means 186. The brush plate assembly 60 comprises a yoke 188 having means therein for mounting brush boxes 190 thereto. A will be appreciated by those skilled in the art, the brush boxes 190 are operatively positioned on the yoke 188 to receive conventional brushes 62 which are inserted in the brush boxes 190. A plurality of springs 192, one for each brush 62 and box 190 combination, are operatively positioned on the yoke 188 and in contact with the brush so that each brush is urged toward the center 194 of the brush plate assembly 60 for operative contact with the commutator 32.

END SHIELDS

The rear end shield 66 comprises an integral member 196 (preferably aluminum) having a bearing receiving means 68 formed on one side for receiving a bearing 78, a first set of holes 200 for receiving the bolt means 146 which maintain the integrity of the motor and a second set of holes 202 for receiving screws 204 which operatively retain the bearing means 78 in the bearing receiving means 68. The brushes 62 are positioned between the stator means 42 and the end shield 66 so that they do not interfere with the insertion of the bolts 146 through the end shield aperture 200, stator lamination hole 144, and adapter 76 while being assembled from the end shield end 70 of the motor 20.

The bearing means 78 is operatively retained in the end shield 68 by a bearing retainer means 206 which comprises a circular member 208 and a pair of extension members 210. The extension members 210 cooperate with the apertures 202 so that the bearing retainer 206 is operatively positioned in the bearing means 78.

MOTOR ASSEMBLY

The illustrated embodiment of the motor incorporating the present invention is more easily and thus more economically assembled than prior existing motors. The shell 40 having the brackets 186 is first stamped, then rolled and formed as shown in FIG. 3A all by conventional methods. The stator 42, the rotor 22, and the brush plate assembly 60 are each preferably independently assembled.

Specifically, during the assembly of the rotor a contoured shaft receives a stack of interlocked laminations having a predetermined length. The stack of laminations is preferably press fit onto the shaft. Insulation material is inserted into each slot 30 from one or the other end of the stack. After the slot insulation material has been inserted, a plurality of conductors bars are inserted into the slot between the insulation means as shown in FIG. 5B. The conductor bars are inserted from the spline end 72 of the shaft toward the commutator, end 70 of the shaft 24. A commutator 32 is connected to the shaft in a manner that will be understood by those skilled in the art. After the insertion of the bars and the attachment of the commutator to the shaft, the loose ends of the bars are operatively connected to the riser.

It is preferred that, in order to save material and simplify the motor assembly process, the riser be eliminated and the conductive bars be connected directly to the commutator. It is believed that the direct connection of the loose ends of the bars to the commutator can be accomplished by brazing the bottom wire directly to the commutator and then brazing the upper or top wire to the lower wire. By utilizing this method of connection between the magnet wire conducting members or bars and the commutator, it is believed that the riser can be eliminated thereby significantly reducing the amount of copper and other material utilized to make commutators. This proposed construction is believed to be both structurally and electrically satisfactory for motors utilized in golf cart applications.

As presently constructed, a pair of bands 212, 214, one near each end of the conductive bars 36, is placed around the conductive bars for support purposes so that the bars do not "explode" or expand outwardly while the motor is running. Since the motor lamination slots are semi-closed and the rotor core has been lengthened, it is believed that the bands may not be necessary and could be eliminated thus achieving additional material and motor assembly cost reductions.

A number of interlocked stator laminations is assembled into a predetermined length. The coils 50, which are illustrated as comprising the equivalent of 5 turns of copper wire preferably having a diameter of 0.182 inches (0.46 cm), are wound about the poles and connected to terminals. At this point the stator assembly 42 is ready for insertion into the shell 40.

The brush plate assembly 60 is manufactured by conventionally producing the yoke which has various connecting means formed therein. Four brush boxes are conventionally attached to the yoke and four brushes, which are electrically connected to another set of terminals are positioned in the brush boxes. A coil spring is operatively positioned relative to each brush so that the force of the spring urges the brush towards the center of the yoke. The brush plate assembly 60 is now ready for assembly into the shell.

Once the rotor, the stator assembly, the brush plate assembly, and the shell are each separately and independently assembled, with the adapter 76 or alternatively the front end shield 67 and the rotor in position, the stator assembly is positioned in the shell in a manner known to those skilled in the art followed by the connection of the brush plate assembly to the shell by the brackets 186. The rear end shield is next positioned on the brush plate assembly end of the shell, screws 204 are connected to the bearing retainer 206, and end shield apertures 200 aligned with the stator lamination holes 144. Once aligned, the bolts 146 are inserted through the apertures 200, 144 and operatively connected to the adapter 76 or alternatively, the front end shield 67 forming an assembled motor 20.

The brackets 186 and the stator 48 are positioned relative to the shell 40 so that when the brush plate assembly 60 is mounted in the shell, the brush plate assembly 60 does not interfere with the insertion of the bolts 146 through the interior of the shell from the end shield, through the stator assembly into the adapter or front end shield.

As can be seen with reference to Table 2, when compared to prior motors, the illustrated embodiment has reduced the rotor outer diameter from approximately 4½ inches (11.43 cm) to approximately 4 inches (10.16 cm) (approximately 11%) with no corresponding magnetic flux reduction while maintaining a nearly identical output, slightly increasing motor efficiency and, in some cases, increasing horsepower.

The test results for the various motors illustrated in Table 2 were compiled utilizing a elbow rotary torque transducer, a calibrated shunt to sense current with a voltmeter, a voltmeter to measure voltage and a speed pickup. The performance points were taken as follows for each motor tested: (1) motor voltage was set to 36 volts; (2) load was set to 40 ounce-feet; and (3) speed and current were measured and recorded. The same procedure was immediately followed for 60, 80, 160, 240, 320, 400, 480, and 560 ounce-feet. Since considerable motor heating can take place at higher currents (i.e. at higher loads), the motors were then allowed to cool to room temperature (approximately 25° C.) and again load was set to 560 ounce-feet. The volts, amps, torque and speed were then recorded.

TABLE 2

| | | PERFORMANCE | | | | | | | | | | | |
|---|---|---|---|---|---|---|---|---|---|---|---|---|---|
| TORQUE | | NEW DESIGN MEASURED | | EFF | PRIOR #1 MEASURED | | | PRIOR #2 MEASURED | | | PRIOR #3 MEASURED | | |
| (OZ-FT) | VOLTS | RPM | AMPS | (%) | RPM | AMPS | EFF (%) | RMP | AMPS | EFF (%) | RPM | AMPS | EFF (%) |
| 40 | 36 | 3235 | 41.4 | 77.075 | 3266 | 42 | 76.702 | 3266 | 43.6 | 73.888 | 3283 | 43.2 | 74.460 |
| 60 | 36 | 2828 | 51.5 | 81.247 | 2825 | 51.7 | 80.846 | 2838 | 53.9 | 77.903 | 2840 | 54 | 77.814 |
| 80 | 36 | 2593 | 62.5 | 81.845 | 2513 | 61 | 81.271 | 2563 | 64 | 79.002 | 2572 | 64.75 | 78.362 |
| 160 | 36 | 2052 | 101.5 | 79.765 | 2022 | 100.9 | 79.066 | 2002 | 102.2 | 77.289 | 2051 | 103.75 | 77.997 |
| 240 | 36 | 1797 | 139 | 76.511 | 1729 | 135.5 | 75.518 | 1720 | 138 | 73.764 | 1769 | 140 | 74.781 |
| 320 | 36 | 1619 | 177.8 | 71.853 | 1510 | 169 | 70.505 | 1510 | 172.5 | 69.075 | 1554 | 174.3 | 70.353 |
| 400 | 36 | 1478 | 216.5 | 67.338 | 1336 | 200 | 65.890 | 1334 | 206 | 63.875 | 1365 | 207.5 | 64.887 |
| 400 HOT | 36 | 1311 | 252 | 61.578 | 1173 | 230 | 60.366 | 1143 | 238 | 56.845 | 1174 | 240.5 | 57.780 |
| 560 | 36 | 1200 | 290.5 | 57.043 | 1050 | 260.3 | 55.704 | 990 | 270 | 50.634 | 1010 | 272.5 | 51.183 |
| 560 | 36 | 1270 | 290 | 60.475 | 1119 | 259 | 59.662 | 1105 | 270 | 56.516 | 1154 | 271 | 58.804 |

TABLE 3

PERFORMANCE COMPARISON
GENERAL ELECTRIC TRACTION MOTOR

| | PRIOR MOTOR | | | ILLUSTRATED EMBODIMENT | | |
|---|---|---|---|---|---|---|
| | FL | 4 × FL | LR* | FL | 4 × FL | LR* |
| RPM | 2825 | 1792 | 0 | 2828 | 1797 | 0 |
| TORQUE (OZ-FT) | 60 | 240 | 1772.8 | 60 | 240 | 1772.8 |
| HORSEPOWER | 2.02 | 4.94 | — | 2.02 | 5.13 | — |
| LINE VOLTS | 36 | 36 | 36 | 36 | 36 | 36 |
| LINE AMPS | 51.7 | 135.5 | 644 | 51.5 | 139 | 711 |
| WATTS IN | 1861.2 | 4878 | 23184 | 1854 | 5004 | 25596 |
| EFFICIENCY (%) | 80.85 | 75.52 | — | 81.25 | 76.51 | — |

Locked rotor values calculated.

TABLE 4

WINDING COMPARISON
GENERAL ELECTRIC TRACTION MOTOR

| | PRIOR MOTOR | ILLUSTRATED EMBODIMENT |
|---|---|---|
| FIELD WINDING | | |
| WIRE TYPE | RECTANGULAR COPPER | ROUND WIRE |
| WIRE SIZE | .125 × .195 | .182 DIA |
| CROSS SECTIONAL AREA (IN²) | .024375 | .0260155 |
| TURNS PER COIL | 8 | 5 |
| RESISTANCE (OHMS) | .012 | .007 |
| FIELD WINDING WEIGHT (LBS) | 3.31 | 2.20 |
| ARMATURE WINDING | | |
| WIRE TYPE | RECTANGULAR COPPER | RECTANGULAR COPPER |
| WIRE TYPE | .045 × .180 | .045 × .180 |
| CROSS SECTIONAL AREA (IN²) | .0081 | .0081 |

TABLE 4-continued

WINDING COMPARISON
GENERAL ELECTRIC TRACTION MOTOR

|  | PRIOR MOTOR | ILLUSTRATED EMBODIMENT |
| --- | --- | --- |
| TURNS PER COIL | 1 | 1 |
| RESISTANCE | .0193 | .0193 |
| ARMATURE WINDING WEIGHT (LBS) | 2.40 | 2.40 |
| ARMATURE STACK AXIAL LENGTH | 3.00 | 3.25 |
| OVERALL MOTOR WEIGHT (LBS) | 38 lbs 4 oz. | 33 lbs 8 oz. |

It should be noted that an optimal test would be a continuous short duration test where the load started low and was raised rapidly while continuously measuring torque, speed, volts and current. Duration of the test would be short enough so that minimal motor heating occurs yet slow enough that dynamic motor transients could be ignored.

As can be seen in Tables 2 and 3, when compared to three prior motors, the illustrated embodiment has a higher efficiency throughout the range of operation. The improved efficiency for the new improved motor design ranges from about ½ of one percent to about 6 percent at various operating loads when compared to the prior motors.

With reference to Table 3, at four times the full-load torque, the illustrated embodiment produces more horsepower and almost a full percent efficiency improvement over the best of the prior motors.

Table 4 illustrates, among other things, the reduced amount of pounds of copper (32.5% less) required in the field stator windings and the 4 pound 8 oz. reduction in overall weight (11.77% less) of the illustrated embodiment compared to one prior existing motors used in golf cart applications.

While the methods and articles herein described constitute preferred embodiments of the invention, it is to be understood that the invention is not limited to these precise methods and articles, and that changes may be made therein without departing from the scope of the invention which is defined in the appended claims.

What is claimed as new and desire to secure by letters patent of the United States is:

1. A dynamoelectric machine comprising:
   a shell;
   a stator assembly comprising a stator core formed of ferromagnetic material having a cylindrical bore therein and disposed within the shell;
   stator winding means operatively positioned on the stator core; and
   a rotor core comprising a plurality of ferromagnetic laminations, each of the rotor core laminations having a plurality of equally circumferentially spaced semi-closed slots extending radially proximate the outer periphery of the lamination, the slots having sufficient area for receiving conducting means therein, wherein the ratio of the number of rotor lamination slots to the rotor outer diameter measured in inches is greater than 14.0.

2. The dynamoelectric machine of claim 1 wherein the ratio of the number of rotor lamination slots to the rotor lamination outer diameter measured in inches is 15.75.

3. The dynamoelectric machine of claim 1 wherein the ratio of the rotor lamination outer diameter measured in inches to the rotor slot length measured in inches is from about 9.04 to about 9.16.

4. The dynamoelectric machine of claim 1 wherein the ratio of the rotor slot length measured in inches to the rotor slot opening width measured in inches is from about 10.8 to about 12.5.

5. A dynamoelectric machine comprising:
   a shell;
   a stator assembly comprising a laminated core having a cylindrical bore therein and being operatively associated with the shell;
   stator winding means operatively positioned relative to the stator core; and a rotor comprising a laminated core, said rotor core having a plurality of equally circumferentially spaced semi-closed slots extending radially proximate the outer periphery of the core, the slots defining areas for receiving conducting means therein, wherein the ratio of rotor slot depth to rotor sot opening width is from about 10.8 to about 12.5.

6. A lamination for use in a rotor core in a dynamoelectric machine comprising:
   a circular ferromagnetic plate having a plurality of equally circumferentially spaced semi-closed slots extending radially proximate the outer periphery of the plate for receiving conducting means therein, the conducting means extending radially along the rotor when the plates are stacked with corresponding slots in communication with one another, each of the slots having an area at least sufficient for allowing the conducting means and sufficient insulation means to be operatively positioned therein, wherein the ratio of the number of lamination slots to. the lamination outer diameter measured in inches is greater than 14.0.

7. The lamination of claim 6 wherein the ratio of the number of slots to the lamination outer diameter measured in inches is about 15.75.

8. The lamination of claim 6 wherein the ratio of the lamination diameter measured in inches to the lamination slot length measured in inches is from about 9.04 to about 9.16.

9. The lamination of claim 6 wherein the ratio of the lamination slot length measured in inches to the width of the lamination slot opening measured in inches is about 10.8 to about 12.5.

10. A lamination for use in a rotor core in a dynamoelectric machine comprising:
   a circular ferromagnetic plate having a plurality of equally circumferentially spaced semi-closed slots extending radially proximate the outer periphery of the plate for receiving conducting means therein, the conducting means extending radially along the rotor when the plates are stacked with corresponding slots in communication with one another, each of the slots having an area at least sufficient for allowing the conducting means and sufficient insulation means to be operatively positioned therein, wherein the ratio of the lamination slot depth to the width of the lamination slot opening is about 10.8 to about 12.5.

11. A lamination for use in a generally cylindrical stator core in a dynamoelectric machine having a shell comprising;
- a flat, annular plate of ferromagnetic material comprising a plurality of poles and a yoke extending about the periphery of the plate, said plate having a given outer diameter and a generally circular bore opening having a predetermined inner diameter determined by the distance between oppositely facing poles which extend inwardly from the outer periphery of the lamination;
- a plurality of apertures, positioned in the plate proximate the outer periphery thereof and centered with respect to each pole, for accommodating attachment means;
- means, positioned in the plate, for operatively connecting together a plurality of like laminations to form a stator core; and
- wherein the ratio of the stator pole neck minimum width to two times the yoke thickness is from about 0.81 to about 0.91.

12. The lamination of claim 11 wherein the ratio of the stator outer diameter to the stator core diameter is approximately 1.6.

13. A dynamoelectric machine comprising:
a stator comprising:
a shell;
a stator core positioned within and operatively associated with the shell, said stator core comprising a plurality of ferromagnetic stator laminations that collectively define a number of stator poles and a central bore in the stator core;
stator winding means operatively positioned about each of the stator poles;
each stator lamination comprising:
- a flat annular plate of ferromagnetic material comprising an annular yoke having a preselected outer diameter, poles extending radially inwardly from the yoke with faces of the poles defining a generally circular bore opening of a predetermined inner diameter, the inner diameter being determined by the distance between diametrically oppositely facing pole faces;
- a plurality of holes operatively positioned in the yoke proximate to the outer periphery thereof, and centered with respect to each pole for receiving attachment means therethrough; and
a rotor comprising:
- a plurality of ferromagnetic rotor laminations, the outer peripheries of which establish a rotor outer diameter, each of the rotor laminations having a plurality of equally circumferentially spaced semi-closed conductor receiving slots, having a preselected depth, extending radially proximate the outer periphery of the laminations, wherein the ratio of the number of slots in the rotor to the rotor outer diameter, in inches, is greater than 14.

14. The machine of claim 13 wherein the ratio of the number of rotor lamination slots to the rotor outer diameter, in inches, is about 15.75.

15. The machine of claim 13 wherein the ratio of the rotor outer diameter to the rotor lamination slot depth is from about 9.04 to about 9.16.

16. The machine of claim 13 wherein the poles each include a neck that interconnects the poles and yoke, and wherein the ratio of a stator pole neck width at its minimum width location to two times the stator yoke thickness is from about 0.81 to about 1.0.

17. A stator lamination for forming a generally cylindrical core in a dynamoelectric machine, the lamination comprising:
- a flat annular plate of ferromagnetic material having an annular yoke with a predetermined outer diameter and a bore opening of a preselected inner diameter, the inner diameter being determined by the distance between opposing poles which extend inwardly from the outer periphery of the lamination;
- at least four holes located in the yoke proximate the outer periphery thereof and centered with respect to each pole for receiving attachment means therethrough;
- a plurality of interlocking means operatively positioned in the plate for interlocking the plurality of laminations together to form a stator core, and wherein the ratio of the stator pole neck minimum width to two times the stator yoke thickness is from about 0.81 to about 0.91.

18. A dynamoelectric machine comprising:
a shell;
a stator assembly having at least four poles operatively positioned in the shell, the stator assembly comprising a stack of ferromagnetic stator laminations having a plurality of poles that each have generally the same geometric shape, and a cylindrical bore formed therein; said stator assembly also having a plurality of sets of stator windings with a stator winding accommodated on each pole;
each stator lamination comprising:
- a flat annular plate of ferromagnetic material having a predetermined outer diameter and a generally circular bore opening of a preselected inner diameter, the inner diameter being determined by the distance between the opposing poles which extend inwardly from the outer periphery of each lamination;
- at least one connection means for each pole operatively positioned in the plate proximate the outer periphery thereof and centered with respect to each pole for receiving attachment means therethrough;
- a plurality of interlocking means operatively positioned in the plate for interlocking the plurality of laminations together to form a stator core; and
a rotor comprising a plurality of ferromagnetic laminations that form a core, each of the laminations having a plurality of equally circumferentially spaced semi-closed slots extending radially proximate the outer periphery of the lamination, the slots defining areas for receiving at least two conducting means therein, and wherein the ratio of the number of rotor lamination slots to the rotor lamination outer diameter, in inches, is about 15.75.

19. The machine of claim 18 wherein the connection means comprise holes, and the distance of each hole from the outer periphery of the stator lamination at each pole is at least equal to the thickness of the ferromagnetic material.

* * * * *